US011850640B2

(12) United States Patent
Yu et al.

(10) Patent No.: US 11,850,640 B2
(45) Date of Patent: Dec. 26, 2023

(54) VACUUM CRACKING METHOD AND CRACKING APPARATUS FOR POWER BATTERY

(71) Applicants: GUANGDONG BRUNP RECYCLING TECHNOLOGY CO., LTD., Foshan (CN); HUNAN BRUNP RECYCLING TECHNOLOGY CO., LTD., Changsha (CN); HUNAN BRUNP EV RECYCLING CO., LTD., Changsha (CN)

(72) Inventors: Haijun Yu, Foshan (CN); Yinghao Xie, Foshan (CN); Benben Wu, Foshan (CN)

(73) Assignees: GUANGDONG BRUNP RECYCLING TECHNOLOGY CO., LTD., Foshan (CN); HUNAN BRUNP RECYCLING TECHNOLOGY CO., LTD., Foshan (CN); HUNAN BRUNP EV RECYCLING CO., LTD., Foshan (CN)

( * ) Notice: Subject to any disclaimer, the term of this patent is extended or adjusted under 35 U.S.C. 154(b) by 0 days.

(21) Appl. No.: 18/042,768

(22) PCT Filed: Apr. 30, 2021

(86) PCT No.: PCT/CN2021/091567
§ 371 (c)(1),
(2) Date: Feb. 23, 2023

(87) PCT Pub. No.: WO2022/041822
PCT Pub. Date: Mar. 3, 2022

(65) Prior Publication Data
US 2023/0241654 A1 Aug. 3, 2023

(30) Foreign Application Priority Data

Aug. 24, 2020 (CN) .......................... 202010857403.3

(51) Int. Cl.
*C10B 47/40* (2006.01)
*B09B 3/35* (2022.01)
(Continued)

(52) U.S. Cl.
CPC .................. *B09B 3/35* (2022.01); *B09B 3/38* (2022.01); *B09B 3/40* (2022.01); *C10B 47/40* (2013.01);
(Continued)

(58) Field of Classification Search
CPC .......... C10B 47/40; C10B 53/00; B09B 3/35; B09B 3/38; B09B 3/40; H01M 10/54
See application file for complete search history.

(56) References Cited

U.S. PATENT DOCUMENTS 6,686,086 B1 2/2004 Martin et al.
2021/0308644 A1* 10/2021 Araújo Carreira ...... C10G 1/10
(Continued)

FOREIGN PATENT DOCUMENTS

| CN | 107774698 A | 3/2018 |
| CN | 108400400 A | 8/2018 |

(Continued)

OTHER PUBLICATIONS

International Search Report and Written Opinion in PCT/CN2021/091567 dated Jul. 21, 2021.
First Office Action in Chinese Patent Application 202010857403.3 dated Jun. 2, 2021.
Second Office Action in Chinese Patent Application 202010857403.3 dated Dec. 22, 2021.
(Continued)

*Primary Examiner* — Jonathan Miller
(74) *Attorney, Agent, or Firm* — Buchalter; Jason W. Croft

(57) ABSTRACT

A vacuum cracking method and a cracking apparatus for a power battery are disclosed. The vacuum cracking method includes the following steps that: waste power batteries are fed from a feed hopper and then enter a rolling unit for rolling treatment to obtain a crushed material; the crushed
(Continued)

material is transported to a cracking unit for preheating, then heated and cracked under an inert atmosphere or vacuum to obtain cracked gas, solid cracked products and non-crackable products; and the solid cracked products and the non-crackable products are transported to a pyrolysis unit for pyrolysis at an aerobic atmosphere to obtain pyrolysis gas and non-pyrolysis products.

8 Claims, 5 Drawing Sheets

(51) Int. Cl.
    *B09B 3/38*     (2022.01)
    *B09B 3/40*     (2022.01)
    *C10B 53/00*     (2006.01)
    *H01M 10/54*     (2006.01)
    *B09B 101/16*     (2022.01)

(52) U.S. Cl.
    CPC .............. *C10B 53/00* (2013.01); *H01M 10/54* (2013.01); *B09B 2101/16* (2022.01)

(56) References Cited

U.S. PATENT DOCUMENTS

| | | | |
|---|---|---|---|
| 2022/0263147 A1* | 8/2022 | Lubomirsky | ............. B09B 3/40 |
| 2023/0076830 A1* | 3/2023 | Verma | ...................... C22B 7/005 |
| 2023/0104953 A1* | 4/2023 | Iseki | ....................... B02C 13/16 |
| | | | 241/23 |

FOREIGN PATENT DOCUMENTS

| | | |
|---|---|---|
| CN | 109888370 A | 6/2019 |
| CN | 110734791 A | 1/2020 |
| CN | 111495925 A | 8/2020 |
| CN | 112097274 A | 12/2020 |
| CN | 112139203 A | 12/2020 |
| CN | 112139203 B | 8/2022 |
| JP | 2017112078 A | 6/2017 |
| WO | 2022041822 A1 | 3/2022 |

OTHER PUBLICATIONS

Notification to Grant Patent Right for Invention in Chinese Patent Application 202010857403.3 dated Jun. 15, 2022.

* cited by examiner

US 11,850,640 B2

VACUUM CRACKING METHOD AND CRACKING APPARATUS FOR POWER BATTERY

CROSS-REFERENCE TO RELATED APPLICATION

This application is a national stage filing under 35 U.S.C. § 371 of international application number PCT/CN2021/091567, filed Apr. 30, 2021, which claims priority to Chinese patent application No. 202010857403.3 filed Aug. 24, 2020. The contents of these applications are incorporated herein by reference in their entirety.

TECHNICAL FIELD

The present disclosure belongs to the field of recycling power batteries and particularly relates to a vacuum cracking method and a cracking apparatus for a power battery.

BACKGROUND

According to the statistics of the Ministry of Industry and Information Technology, the production and sales of new energy vehicles in China were 1,242,000 and 1,206,000 respectively in 2019. In 2019, the output of lithium-ion batteries was 15.72 billion with an increase of 4.0% over the previous year. The service life of 3C small battery is generally 1-2 years, and the service life of the power battery is generally 3-5 years. A large number of battery applications are likely to lead to scrapping of a large number of batteries. If the waste batteries are not effectively treated, it will cause serious harm to the environment. The waste batteries contain organic substances such as separators, binders and electrolytes, which need to be subjected to harmless treatment at a high temperature during treatment.

The traditional high-temperature treatment method is a method using aerobic pyrolysis or anaerobic cracking singly. The traditional aerobic pyrolysis method is easy to produce dioxin in the pyrolysis process, and there is a risk of secondary pollution; and furthermore, a lot of heat is produced by pyrolysis and cannot be recovered, which enables control on a temperature in a furnace to be difficult. The traditional anaerobic cracking method produces tar, cokes and other products after cracking, racked products have a negative impact on the subsequent battery recycling process, resulting the problems of increasing acid and alkali consumption, solid waste residues and the difficulty of wastewater treatment and the like, so that the limitation is obvious.

SUMMARY

The objective of the present disclosure is to provide a cracking method and a cracking apparatus for a power battery. In the method, by combining battery cracking and battery pyrolysis, secondary pollution and the impact of cracked products on subsequent processes can be avoided, and the heat after cracking can be recovered.

In order to achieve the above objective, the present disclosure adopts the following technical solution.

A vacuum cracking method for a power battery, includes the following steps that:

(1) after being discharged, waste power batteries are fed from a feed hopper and then enter a roller press for rolling treatment to obtain a crushed material;

(2) the crushed material is transported to a cracking unit through a first sealing unit for preheating, then heated and cracked under an inert atmosphere or vacuum to obtain cracked gas, solid cracked products and non-crackable products; and (3) the solid cracked products and non-crackable products are transported to a pyrolysis unit through a second sealing unit for pyrolysis in an aerobic atmosphere to obtain pyrolysis gas and non-pyrolysis products; the pyrolysis gas is mainly composed of carbon dioxide and water vapor, and the non-pyrolysis products are mainly cathode material powder, anode material powder, copper powder, iron powder, aluminum powder and oxides of copper, iron and aluminum.

Preferably, the step (1) further includes discharge treatment on the waste power batteries before the rolling.

Preferably, in the step (1), the rolling is performed with a pressure of 50-150 MPa, a rotating speed of 0.5-2 m/s, and a rolling gap width of 5-50 mm.

Preferably, in the step (2), the cracking is gradient cracking with gradient temperatures of 350-450° C., 450-550° C. and 550-650° C. and a cracking time of 0.2-5 h.

Preferably, in the step (2), the heating is performed at a heating rate of 3-10° C./min.

Preferably, in the step (2), the cracked gas is a mixture of C3-C12 alkenes and alkanes.

Preferably, in the step (2), the preheating is performed at a temperature of 100-200° C.

Preferably, in the step (2), the inert atmosphere is a nitrogen atmosphere; and the vacuum pressure is 10-30 kPa.

Preferably, in the step (2), the cracked gas is used as a fuel for pyrolysis in the step (3).

Preferably, in the step (3), a pyrolysis temperature is 400-600° C., a pyrolysis time is 0.5-5 h, a pyrolysis pressure is atmospheric pressure, the atmosphere is air, and a rotating speed of a pyrolysis paddle is 5-60 r/min.

Preferably, in the step (3), the cathode material powder is one of nickel cobalt lithium manganese, lithium iron phosphate or lithium manganese; and the anode material powder is one of graphite or lithium titanate.

Preferably, in the step (3), valuable metal elements such as metal Li, Ni, CO and Mn are further be extracted from the cathode material powder or anode material powder by a hydrometallurgical method commonly used in the art.

A vacuum cracking apparatus for the power battery includes a cylinder and further includes following components arranged sequentially from top to bottom:

a rolling unit, arranged in the cylinder and the including a plurality of pressure rollers arranged at intervals in a vertical direction and a fifth driving apparatus for driving rotation of the pressure rollers;

the first sealing unit, arranged in the cylinder;

a cracking unit, arranged in the cylinder and including a first heater, a first air inlet, a first air outlet and a pipeline, where the first heater is arranged outside the cylinder and heats the outer surface of the cylinder, and the pipeline is connected with the first heater and the first air outlet;

the second sealing unit, arranged in the cylinder;

a pyrolysis unit, arranged in the cylinder and including a second heater, a second air inlet, a second air outlet, a first stirring paddle and a first driving unit for driving rotation of the first stirring paddle, where the second heater is arranged outside the cylinder to make the second heater heat the outer surface of the cylinder, and the second heater is connected with the pipeline; and the third sealing unit, arranged in the cylinder.

According to some embodiments of the present disclosure, the cracking unit further includes a first screw arranged transversely, a second driving unit, a barrel body, a propeller, a third driving unit and a first bottom plate. The second driving unit is used for driving the first screw to rotate, the third driving unit is used for driving the propeller to rotate, the barrel body is installed below the first screw, the first bottom plate is installed below the barrel body, and the propeller is located in the barrel body and installed on the first bottom plate; the diameter of the barrel body is smaller than that of the cylinder, an opening of the barrel body faces downward, and a clearance space is formed between the opening of the barrel body and the first bottom plate; and a spindle of the propeller is hollow, where the cracked material falls onto the second sealing unit through the hollow portion of the spindle.

Further, according to some embodiments of the present disclosure, air guide holes are formed in the spindle and the barrel body respectively.

Further, according to some embodiments of the present disclosure, the first mixing paddle includes a first shaft and a plurality of blade groups, the plurality of blade groups are distributed on the first shaft at intervals, each blade group includes a plurality of first blades, and a plurality of first blade are circumferentially arranged on the outer surface of the first shaft at intervals.

Further, according to some embodiments of the present disclosure, each of the first sealing unit, the second sealing unit and the third sealing unit includes a circular column, a plug and a fourth driving unit, where the outer surface of the circular column is abutted against the inner surface of the cylinder, a guide groove is formed in the middle part of the circular column, the plug moves up and down along the guide groove, the fourth driving unit is used for driving movement of the plug, and a plurality of pouring grooves are formed in the circular column and are connected with the guide groove and the bottom of the circular column respectively.

Further, according to some embodiments of the present disclosure, each pressure roller is provided with a plurality of first hobbing teeth and a plurality of second hobbing teeth with the diameters smaller than those of the first hobbing teeth; and for every two pressure rollers, the first hobbing teeth of the upper pressure roller correspond to the second hobbing teeth of the lower pressure roller, and the second hobbing teeth of the upper pressure roller correspond to the first hobbing teeth of the lower pressure roller.

Further, according to some embodiments of the present disclosure, a feeding unit is arranged above a rolling unit, is installed on the cylinder and includes a feed hopper, a discharge port and a sixth driving unit. A feed slot is formed in the feed hopper, the bottom of the feed slot is connected with the discharge port, the discharge port is connected with the cylinder, a second screw is arranged in the feed slot, and the sixth driving unit is used for driving the second screw to rotate.

Further, according to some embodiments of the present disclosure, the fourth driving unit includes a screw rod, a worm wheel, a worm and a first motor. A through hole is formed in the middle part of the plug and is provided with threads, the plug is connected with the screw rod, the screw rod is connected with the worm wheel, the worm wheel is connected with the worm, and the worm is connected with the first motor.

Further, according to some embodiments of the present disclosure, the upper end surface of each circular column is in a conical shape.

Further, according to some embodiments of the present disclosure, a main view shape of the plurality of blade groups installed on the first shaft is matched with a shape of the upper end surface of the circular column of the third sealing unit.

Beneficial Effects

1. In the vacuum cracking method of the present disclosure, by combining battery cracking with battery pyrolysis, the advantages of two of battery cracking and battery pyrolysis are fully used, and the disadvantages of battery cracking and battery pyrolysis are overcome, so that the harm of producing dioxin by the traditional pyrolysis process is avoided, pyrolysis is conducted after cracking, and tar and cokes produced after cracking are completely decomposed through aerobic pyrolysis, so that the problems of increasing acid and alkali consumption, solid waste residues and the difficulty of wastewater treatment and the like caused by by-products of the traditional single cracking process to the subsequent process are solved; and by using the cracked gas discharged after cracking as a fuel for cracking and pyrolysis or preheating a pyrolysis unit, resources are fully used.

2. For the cracking apparatus for the power battery of the present disclosure, the first sealing unit, the second sealing unit and the third sealing unit are installed to isolate the cracking unit from the pyrolysis unit and be capable of realizing material transmission and gas isolation without interference with each other, so that gas stirring between an anaerobic zone and an aerobic zone is avoided, the yield of the cracked gas is increased, and production of harmful by-products is effectively avoided at the same time.

3. With a spiral cracking paddle design of the present disclosure in a vertical furnace, gradient temperature controlled cracking of the waste batteries may be realized by setting different temperatures at different positions of the heater of the cracking unit in the process of upward transmission of materials, so that different kinds of organic substances in the waste batteries are cracked step by step and finally completely cracked to obtain target cracked gas with a high calorific value.

4. The present disclosure employs an integrated rolling, cracking and pyrolysis unit to realize one-step fully closed rolling, cracking and pyrolysis of the waste batteries, simplify the intermediate transmission link, effectively avoid dust escape, purify the sanitary environment of a workplace and increase the recovery rate of nickel, cobalt, manganese, lithium and other metals.

BRIEF DESCRIPTION OF DRAWINGS

Additional aspects and advantages of the present disclosure will become apparent and easy to understand from the description of embodiments in combination with the following drawings, where.

Figure 1:
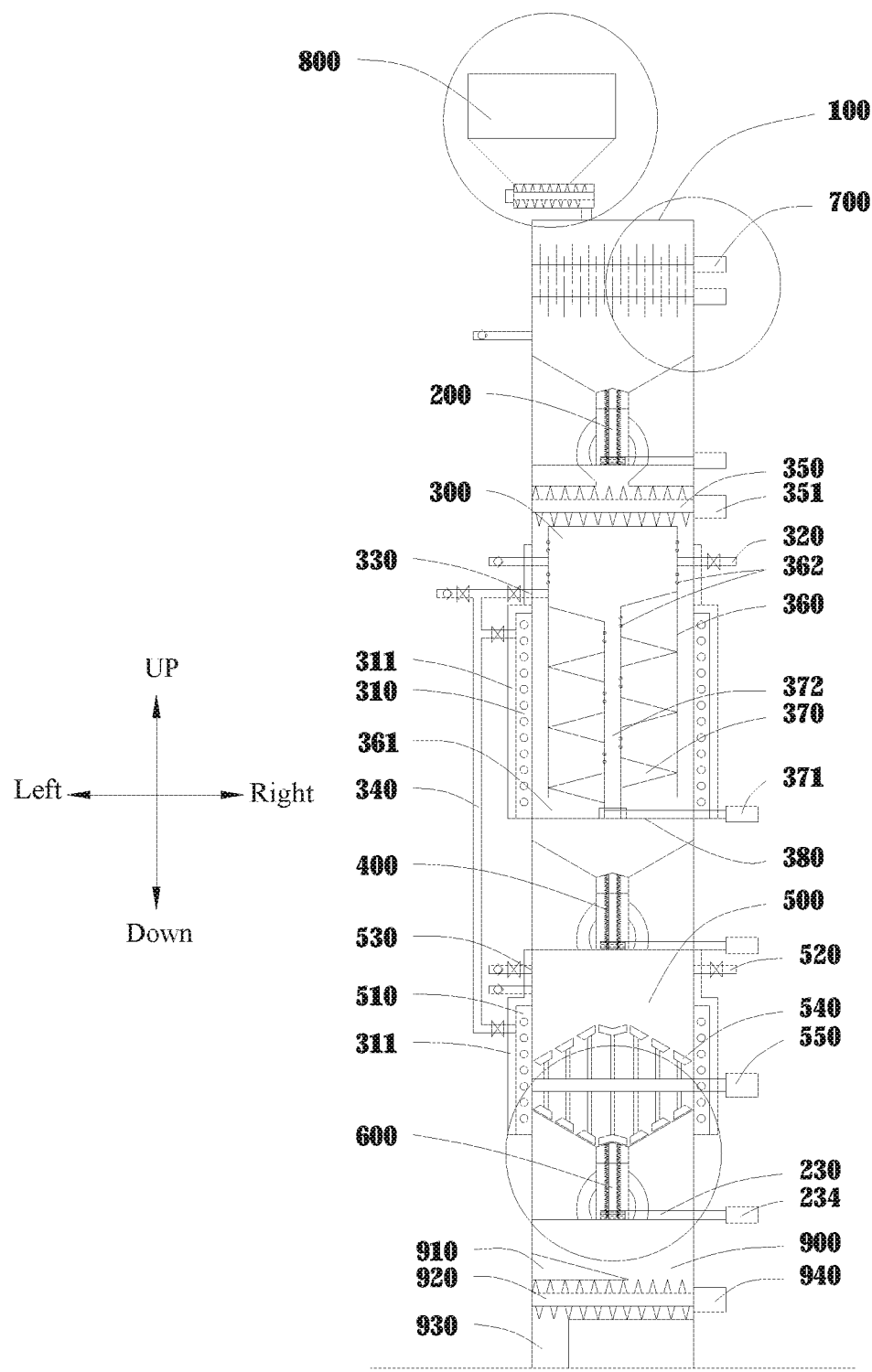
FIG. 1 is a structural diagram of a front view of the interior of a cylinder of a cracking apparatus of a power battery according to embodiment 1 of the present disclosure.

Reference numerals: cylinder 100, first sealing unit 200, circular column 210, guide groove 211, pouring groove 212, plug 220, through hole 221, fourth driving unit 230, screw rod 231, worm wheel 232, worm 233, first motor 234, cracking unit 300, first heater 310, heat insulation layer 311, first air inlet 320, first air outlet 330, pipeline 340, first screw 350, second driving unit 351 barrel body 360, clearance space 361, air guide hole 362, propeller 370, third driving unit 371, spindle 372, first bottom plate 380, second sealing unit 400, pyrolysis unit 500, second heater 510, second air inlet 520, second air outlet 530, first mixing paddle 540, first shaft 541, paddle group 542, first paddle 5421, first driving unit 550, third sealing unit 600, rolling unit 700, pressure roller 710, first hobbing teeth 711, second hobbing teeth 712, fifth driving unit 720, feeding unit 800, feed hopper 810, feed slot 811, discharge port 820, sixth driving unit 830, second screw 840, discharging unit 900, first stop dog 910, third screw 920, discharge opening 930 and second motor 940.

DETAILED DESCRIPTION

In order to make the technical solution of the present disclosure more clearly understood by those skilled in the art, the following embodiments are listed for description. It should be noted that the following embodiments do not limit the protection scope defined by the present disclosure.

Unless otherwise specified, all the raw materials, reagents or apparatuses used in the following embodiments may be obtained from conventional commercial channels or through existing known methods.

Embodiment 1

A vacuum cracking method for a power battery, including the following steps that:

(1) after being discharged, waste power batteries are fed from a feeding unit 800 and then enter a rolling unit 700 with a pressure of 100 MPa and a rotating speed of 1 m/s for rolling treatment to obtain a crushed material;

(2) the crushed material is transported to a cracking unit 300 through a first sealing unit 200, preheated to 200° C., then heated to 350-450° C., 450-550° C. and 550-650° C. at a heating rate of 6° C./min and is subjected to gradient cracking for 2.5 h at an inert atmosphere to obtain mixed gas of C3-C12 alkenes and alkanes, solid cracked products and non-crackable products; and (3) the solid cracked products and the non-crackable products are transported to a pyrolysis unit 500 through a second sealing unit 400 for pyrolysis for 3 h at an air atmosphere and 500° C. to obtain pyrolysis gas and non-pyrolysis products, where the pyrolysis gas is mainly composed of carbon dioxide and water vapor, and the non-pyrolysis products are mainly cathode material powder, anode material powder, copper powder, iron powder, aluminum powder and oxides of copper, iron and aluminum.

Embodiment 2

A vacuum cracking method for a power battery, including the following steps that:

(1) after being discharged, waste power batteries are fed from a feeding unit 800 and then enter a rolling unit 700 with a pressure of 100 MPa and a rotating speed of 1 m/s for rolling treatment to obtain a crushed material;

(2) the crushed material is transported to the cracking unit 300 through a first sealing unit 200, preheated to 200° C., then heated to 350-450° C., 450-550° C. and 550-650° C. at a heating rate of 6° C./min and subjected to gradient cracking for 2.5 h at an inert atmosphere to obtain mixed gas of C3-C12 alkenes and alkanes, solid cracked products and non-crackable products; and (3) the solid cracked products and the non-crackable products are transported to a pyrolysis unit 500 through a second sealing unit 400 for pyrolysis for 3 h at an air atmosphere and 500° C. to obtain pyrolysis gas and non-pyrolysis products, where the pyrolysis gas is mainly composed of carbon dioxide and water vapor, and the non-pyrolysis products are mainly cathode material powder, anode material powder, copper powder, iron powder, aluminum powder and oxides of copper, iron and aluminum.

Embodiment 3

A vacuum cracking method for a power battery, including the following steps that:

(1) after being discharged, waste power batteries are fed from a feeding unit 800 and then enter a rolling unit 700 with a pressure of 100 MPa and a rotating speed of 0.5-2 m/s for rolling treatment to obtain a crushed material;

(2) the crushed material is transported to a cracking unit 300 through a first sealing unit 200, preheated to 200° C., then heated to 350-450° C., 450-550° C. and 550-650° C. at a heating rate of 6° C./min and subjected to gradient cracking for 2 h at an inert atmosphere to obtain mixed gas of C3-C12 alkenes and alkanes, solid cracked products and non-crackable products; and (3) the solid cracked products and the non-crackable products are transported to a pyrolysis unit 500 through a second sealing unit 400 for pyrolysis for 4 h at an air atmosphere and 500° C. to obtain pyrolysis gas and non-pyrolysis products, where the pyrolysis gas is mainly composed of carbon dioxide and water vapor, and the non-pyrolysis products are mainly cathode material powder, anode material powder, copper powder, iron powder, aluminum powder and oxides of copper, iron and aluminum.

Comparative Example 1

A method of anaerobically cracking a power battery, including the following steps that:

(1) waste power batteries are discharged and subjected to rolling treatment at a pressure of 100 MPa and a rotating speed of 1 m/s to obtain a crushed material; and (2) the crushed material is pyrolyzed for 4 h at a nitrogen atmosphere and 500° C. to obtain cathode material powder (such as nickel cobalt lithium manganese, lithium iron phosphate and lithium manganese), anode material powder (such as graphite and lithium titanate), copper powder, iron powder, aluminum powder, pyrolysis gas, pyrolysis oil and cokes.

Comparative Example 2

A method of aerobically cracking a power battery, including the following steps that:

(1) waste power batteries are discharged and subjected to rolling treatment at a pressure of 100 MPa and a rotating speed of 1 m/s to obtain a crushed material; and (2) the crushed material is pyrolyzed for 4 h at an aerobic atmosphere and 500° C. to obtain products which are mainly cathode material powder, anode material powder, copper powder, iron powder, aluminum powder, oxides of copper, iron and aluminum and dioxin.

The air outlets of Embodiments 1-3 and Comparative examples 1-2 are detected to obtain results as shown in Tables 1-4.

TABLE 1

Detection results of cracking and pyrolysis gas outlets in Embodiment 1

| Gas sampling location | VOCs concentration ($\mu g/m^3$) | Pyrolysis gas yield | Dioxin concentration ($pg/m^3$) |
|---|---|---|---|
| Cracking gas outlet | / | 36% | / |
| Pyrolysis gas outlet | <1 | <1 | <0.1 |

TABLE 2

Detection results of cracking and pyrolysis gas outlets in Embodiment 2

| Gas sampling location | VOCs concentration ($\mu g/m^3$) | Pyrolysis gas yield | Dioxin concentration ($pg/m^3$) |
|---|---|---|---|
| Cracking gas outlet | / | 38% | / |
| Pyrolysis gas outlet | <1 | <1 | <0.1 |

TABLE 3

Detection results of cracking and pyrolysis gas outlets in Embodiment 3

| Gas sampling location | VOCs concentration ($\mu g/m^3$) | Pyrolysis gas yield | Dioxin concentration ($pg/m^3$) |
|---|---|---|---|
| Cracking gas outlet | / | 42% | / |
| Pyrolysis gas outlet | <1 | <1 | <0.1 |

TABLE 4

Detection results of cracking and pyrolysis gas outlets in comparative examples 1-2

| Gas sampling location | VOCs concentration ($\mu g/m^3$) | Pyrolysis gas yield | Dioxin concentration ($pg/m^3$) |
|---|---|---|---|
| Comparative example 1 | / | 17% | 166 |
| Comparative example 2 | 170 | / | 450 |

For comparative example 1, only anaerobic cracking is used, while pure anaerobic cracking is relatively high in energy consumption, and long in reaction time. Traditional cracking is static cracking, through which solid reactants do not move, cathode and anode materials and carbon produced by cracking can cover organic substances to be cracked, so that continuous occurrence of cracking reaction is inhibited, and the yield of the cracked gas is relatively low.

The disadvantages of using only aerobic pyrolysis by comparative example 2 are as follows: (1) the dioxin can be produced to cause relatively great environmental pollution, and products that may be reused (cracked gas) cannot be produced; (2) after ignition, the organic substances can be burnt instantly, and a temperature in a furnace can be raised rapidly, so that control on the temperature in the furnace and control on the reaction process are difficult, and the combustion degree is not liable to control; and (3) a pyrolysis furnace is usually not sealed, so that a certain quantity of tail gas can escape during reaction, which is not friendly to the environment.

After the waste power batteries are treated by the vacuum cracking method of the present disclosure, the yield of the cracked gas is high, the cracked gas is completely burnt, and no dioxin and almost no VOCs are produced.

Referring to FIG. 1, the vacuum cracking apparatus for the power battery according to Embodiment 1 of the present disclosure includes a cylinder 100 and further includes following components sequentially arranged from top to bottom:

a rolling unit 700, including a plurality of pressure rollers 710 arranged at intervals in a vertical direction and a fifth driving unit 720 for driving rotation of the pressure rollers 710, where each pressure roller 710 is provided with a plurality of first hobbing teeth 711 and a plurality of second hobbing teeth 712 with the diameters smaller than those of the first hobbing teeth 711;

a first sealing unit 200, arranged upper on the cylinder 100;

a cracking unit 300, arranged in the cylinder 100 and including a first heater 310, a first air inlet 320, a first air outlet 330 and a pipeline 340, where the first heater 310 is arranged outside the cylinder 100 to make the first heater 310 heat the outer surface of the cylinder 100, and the pipeline 340 is connected with the first heater 310 and the first air outlet 330;

a second sealing unit 400, arranged in the cylinder 100;

a pyrolysis unit 500, arranged in the cylinder 100 and including a second heater 510, a second air inlet 520, a second air outlet 530, a first stirring paddle 540 and a first driving unit 550 for driving rotation of the first stirring paddle 540, where the second heater 510 is arranged outside the cylinder 100 to make the second heater 510 heat the outer surface of the cylinder 100, and the second heater 510 is connected with the pipeline 340; and a third sealing unit 600, arranged in the cylinder 100.

For example, as shown in FIG. 1, the cylinder 100 is placed vertically; the first heater 310 and the second heater 510 are cylindrical gas burners using cracked gas as a fuel, specifically, referring to existing cylindrical gas burners; the first sealing unit 200, the second sealing unit 400 and the third sealing unit 600 are used for sealing the cracking unit 300 and the pyrolysis unit 500 and transporting materials; and specifically, the first sealing unit 200, the second sealing unit 400 and the third sealing unit 600 may be switching valves, or may further be designed in such a way that a moving plate and an air cylinder used for driving movement of the moving plate are arranged in the cylinder 100, and the moving plate moves from left to right to realize functions of sealing and conveying; and the first driving unit 550 may be a motor for rotating the air cylinder.

Working process: the waste batteries pass through the feed hopper 810 and then enter the rolling unit 700. Firstly, the waste batteries pass through a rolling zone, are fractured or broken under the action of the pressure rollers and then enter a temporary storage zone; the first sealing unit 200 is opened, so that the rolled batteries fall into the cracking unit 300, nitrogen is introduced through the first air inlet 320, and the first heater 310 is activated, so that the rolled batteries are heated in nitrogen to be cracked; in the process of cracking the batteries, the cracked gas, the solid cracked products and the non-crackable products can be produced; the cracked gas is discharged into the pipeline 340 through the first gas outlet 330, and the pipeline 340 continuously provides the cracked gas to the first heater 310 and preheats the first heater 310, so that the first heater 310 is replenished with the fuel, and then the first heater 310 is ensured to continuously heat the crushed battery; after cracking, the second sealing unit 400 is opened to enable the solid cracked products and the non-crackable products to fall into the pyrolysis unit 500, then the first sealing unit 200 and the second sealing unit 400 are closed to seal the cracking unit 300, and at the same time, the cracking unit 300 cracks the next batch of waste batteries, so that continuous production of the cracked gas is ensured, and then supply of the fuel to the first heater 310 and the second heater 510 is ensured; oxygen is introduced into the pyrolysis unit 500 through the second air inlet 520, and the second heater 510 and the first stirring paddle 540 are started at the same time, so that the solid cracked products and the non-crackable products are continuously rolled in an oxygen-containing state, so that the cracked products produced generated after cracking of the waste batteries are completely decomposed; and the tail gas after pyrolysis is discharged from the pyrolysis unit 500 through an exhaust port, and the pyrolyzed batteries are discharged and cooled through the third sealing unit 600 and then enter the next treatment procedure.

For the vacuum cracking apparatus for the power battery according to the embodiments of the present disclosure, the first sealing unit, the second sealing unit and the third sealing unit are installed to isolate the cracking unit 300 from the pyrolysis unit 500 and be capable of realizing material transmission and gas isolation without interference with each other, so that gas stirring between an anaerobic zone and an aerobic zone is avoided, the yield of the cracked gas is increased, and production of harmful by-products such as dioxin is effectively avoided at the same time; and by combining battery cracking with battery pyrolysis, the advantages of both of battery cracking and battery pyrolysis are fully used, and the disadvantages of battery cracking and battery pyrolysis are overcome, for example, the batteries are cracked to avoid the harm of producing the dioxin by the traditional pyrolysis process; the pyrolysis is conducted after cracking, and the tar and the cokes produced after cracking are completely decomposed through aerobic pyrolysis, so that the problem of increasing acid and alkali consumption, solid waste residues and the difficulty of wastewater treatment and the like caused by by-products of the traditional single cracking process to the subsequent process are solved; and by using the cracked gas discharged after cracking as a fuel for cracking and pyrolysis or preheating the pyrolysis unit, resources are fully used.

In some embodiments of the present disclosure, as shown in FIG. 1, the cracking unit 300 further includes a first screw 350 arranged transversely, a second driving unit 351, a barrel body 360, a propeller 370, a third driving unit 371 and a first bottom plate 380. The second driving unit 351 is used for driving the first screw 350 to rotate, the third driving unit 371 is used for driving the propeller 370 to rotate, the barrel body 360 is installed below the first screw 350, the first bottom plate 380 is installed below the barrel body 360, and the propeller 370 is located in the barrel body 360 and installed on the first bottom plate 380; the diameter of the barrel body 360 is smaller than that of the cylinder 100, an opening of the barrel body 360 faces downward, and a clearance space 361 is formed between the opening of the barrel body 360 and the first bottom plate 380; and a spindle 372 of the propeller 370 is hollow, where the cracked material falls onto the second sealing unit 400 through the hollow portion of the spindle 372. For example, during working, the second driving unit 351 is started to enable the first screw 350 to rotate, the second sealing unit 400, the first heating unit and the third driving unit 371 are opened to enable the crushed waste batteries to fall onto the first screw 350, and the first screw 350 pushes the waste batteries to move to fall onto the first bottom plate 380 from a space between the inner wall of the cylinder 100 and the outer surface of the barrel body 360, the waste batteries are heated by the first heater 310 in the falling process, the waste battery at the bottom is lifted to the top of the propeller 370 by the rotating propeller 370, and since the spindle 372 of the propeller 370 is hollow, the waste battery on the top falls into the spindle 372 and waits for the second sealing unit 400 to open; since the waste batteries are heated for the first time in the falling process and are lifted by the propeller 370 for secondary heating, gradient cracking and full cracking of the waste batteries are achieved, and thus the cracked gas with a high calorific value is produced; the cracked gas with the high calorific value is led to the second heater 510 through the pipeline 340 to enable the second heater 510 to be preheated by the cracked gas with the high calorific value, so that a preheating time of the pyrolysis unit 500 is reduced, and a pyrolysis speed is increased; and the second driving unit 351 and the third driving unit 371 may be motors and rotating cylinders, a worm wheel is connected with the spindle 372, the worm 233 is connected with the worm wheel, and a worm 233 is connected with the motor.

In a further embodiment of the present disclosure, as shown in FIG. 1, both the spindle 372 and the barrel body 360 are provided with air guide holes 362 respectively to discharge the pyrolysis gas in the spindle 372 and the pyrolysis gas in the barrel body 360.

Figure 2:
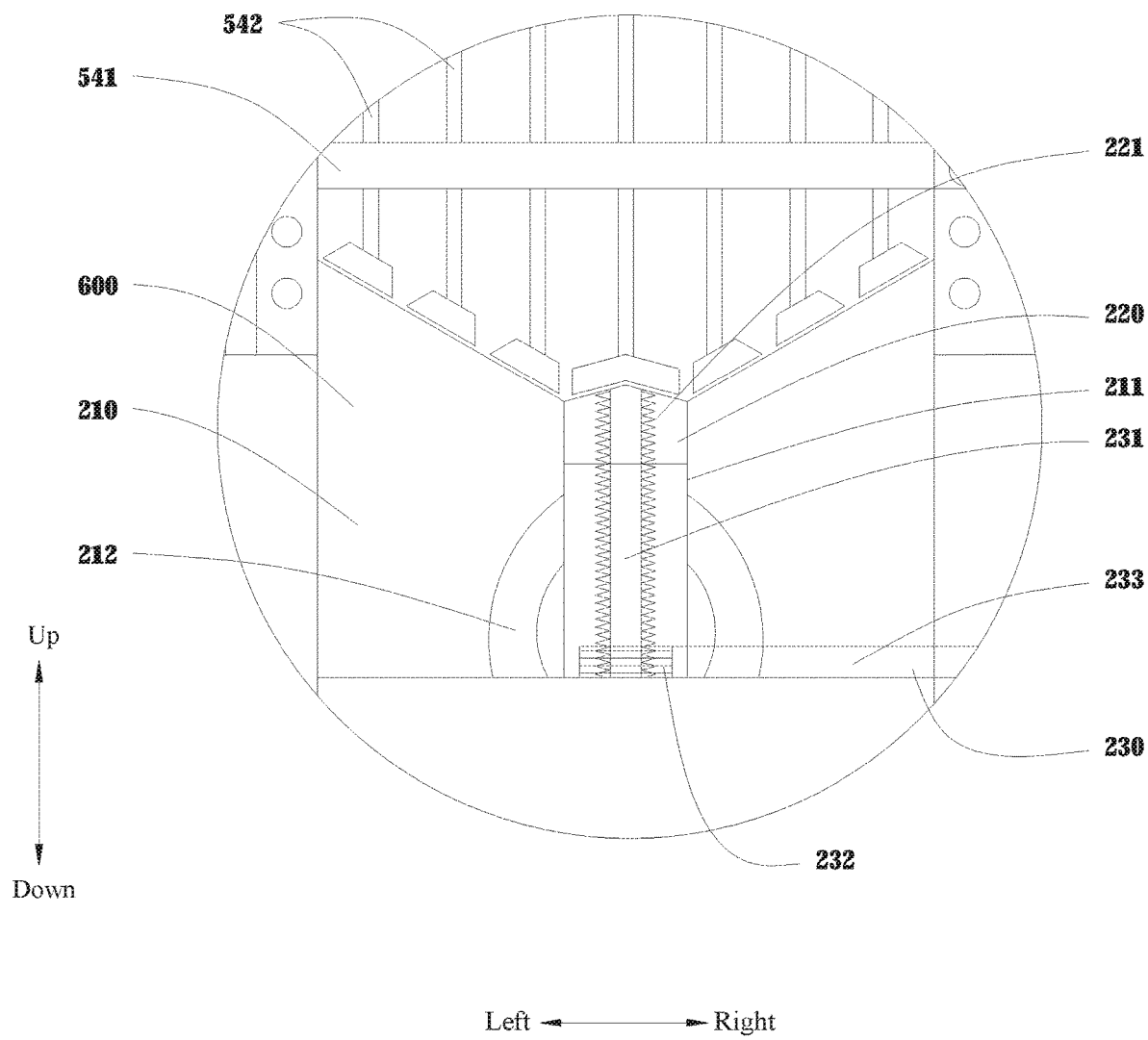
FIG. 2 is a partially enlarged structural diagram of connection between a third sealing unit and a pyrolysis unit as shown in FIG. 1.

In a further embodiment of the present disclosure, as shown in FIGS. 1 and 2, the first mixing paddle 540 includes a first shaft 541 and a plurality of blade groups 542, the plurality of blade groups 542 are distributed on the first shaft 541 at intervals, each blade group 542 includes a plurality of first blades 5421, and the plurality of first blades 5421 are circumferentially arranged on the outer surface of the first shaft 541 at intervals. For example, the first mixing paddle 540 is arranged transversely, the plurality of blade groups 542 are sequentially arranged on the first shaft 541 from left to right at intervals, each blade group 542 includes a plurality of first blades 5421, and the plurality of first blades 5421 take the first shaft 541 as the center and are circumferentially arranged on the outer surface of the first shaft 541 at intervals. Specifically, the amount of the plurality of blade groups 542 may be two, three or more, and the amount of the plurality of first blades 5421 may be two, three or more. When there are four first blades 5421, the four first blades 5421 are arranged in a cross. The plurality of blade groups 542 are arranged to continuously stir pyrolysis products to prevent product accumulation and refine the products, so that a refined product reacts with the second heater 510 and oxygen, and then a speed of pyrolyzing the product is increased; and the first blades 5421 of the blade group 542 located in the middle of the first shaft 541 are in a shape of "Y", and the first blades 5421 of the other blade groups 542 are in a shape of "T", so that the pyrolysis products at the bottom are conveniently stirred.

In some embodiments of the present disclosure, as shown in FIGS. 1 and 2, each of the first sealing unit 200, the second sealing unit 400 and the third sealing unit 600 includes a circular column 210, a plug 220 and a fourth driving unit 230, where the outer surface of the circular column 210 is abutted against the inner surface of the cylinder 100, a guide groove 211 is formed in the middle part of the circular column 210, the plug 220 moves up and down along the guide groove 211, the fourth driving unit 230 is used for driving the plug 220 to move, and a plurality of pouring grooves 212 are formed in the circular column 210 and are connected with the guide groove 211 and the bottom of the circular column 210 respectively. For example, the fourth driving unit 230 may drive the air cylinder, or may be designed in such as way that the plug 220 is connected with the screw 231, the screw 231 is connected with a driven wheel, the driven wheel is connected with a driving wheel through a chain, and the driving wheel is connected with the motor. During working, the fourth driving unit 230 drives the plug 220 to move up and down in the guide groove 211. The plug 220 blocks entry of the waste batteries when moving to the position higher than the pouring grooves 212; and when the plug 220 moves to the position lower than the pouring grooves 212, the waste batteries flow to the position below the circular column 210 through the pouring grooves 212. Specifically, the pouring grooves 212 are "O" shaped grooves, and the amount of the plurality of pouring grooves 212 may be one, two or more.

Figure 3:
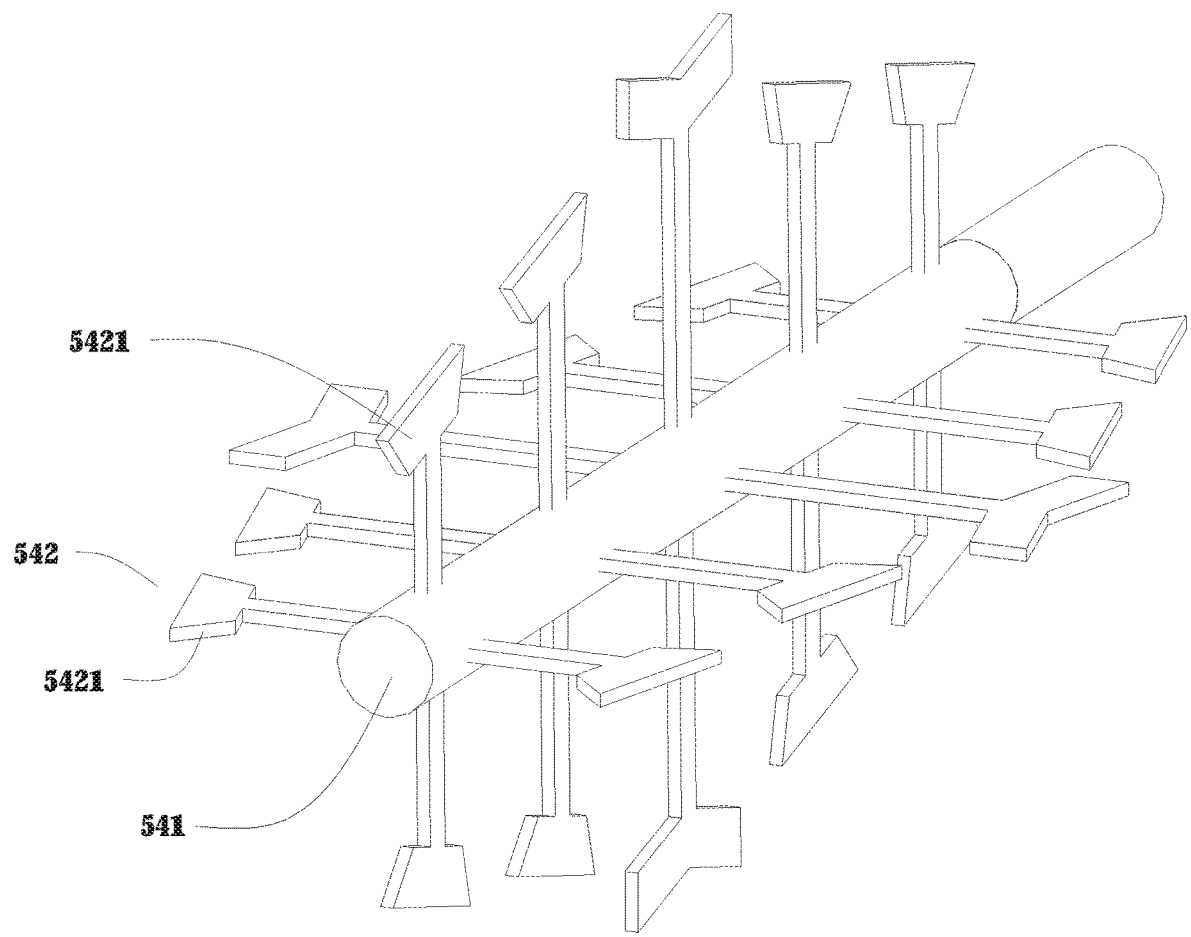
FIG. 3 is a structural diagram of a first mixing paddle as shown in FIG. 1.
Figure 4:
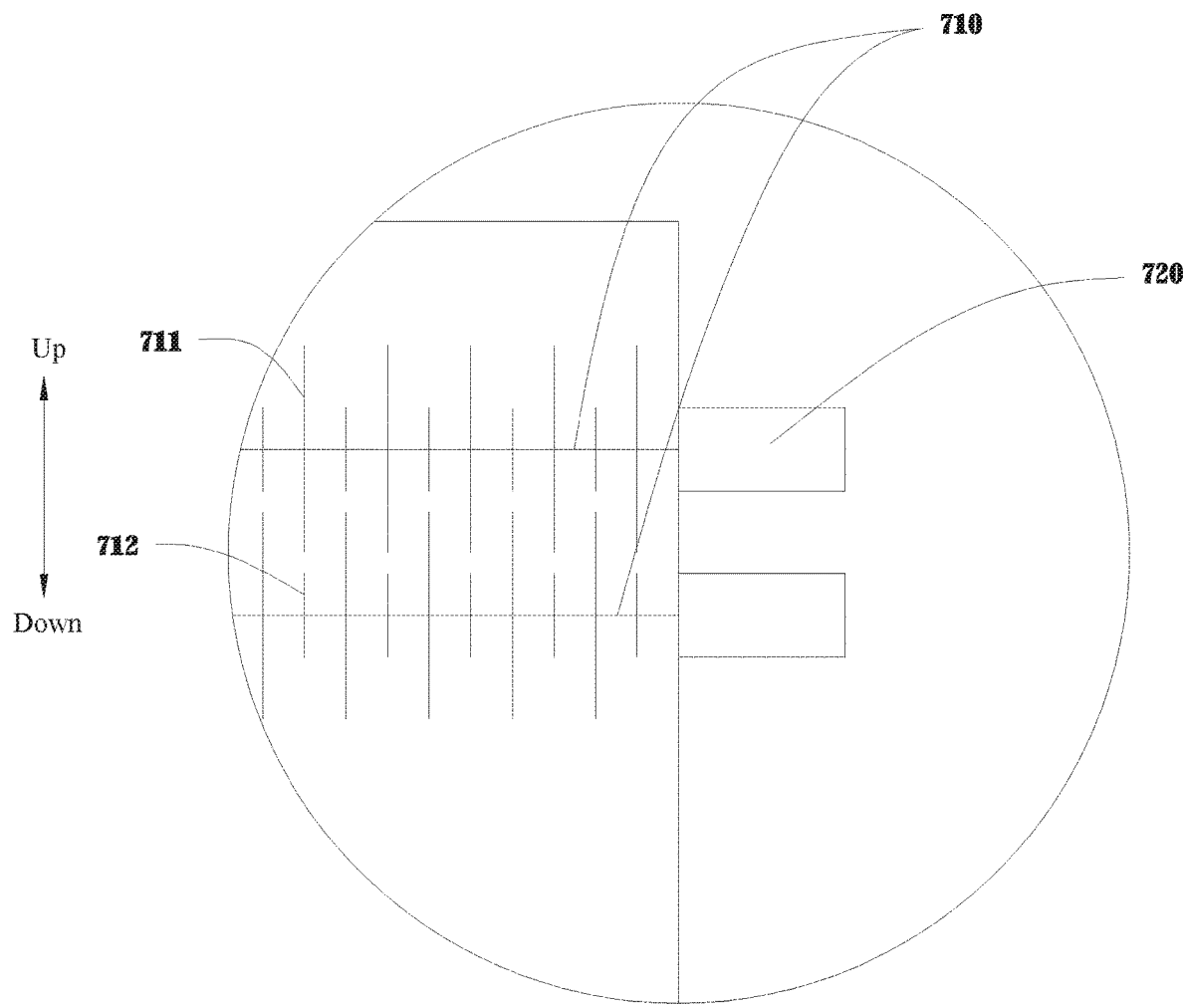
FIG. 4 is a partially enlarged structural diagram of a rolling unit as shown in FIG. 1.

In some embodiments of the present disclosure, as shown in FIGS. 1 and 3, for every two pressure rollers 710, the first hobbing teeth 711 of the upper pressure roller 710 correspond to the second hobbing teeth 712 of the lower pressure roller 710, and the second hobbing teeth 712 of the upper pressure roller 710 correspond to the first hobbing teeth 711 of the lower pressure roller 710. The rolling unit 700 can may be two mutually matched hobbing teeth driven by a motor, or three triangularly distributed hobbing teeth driven by the motor. For example, for the two pressure rollers 710, the arrangement manner of the first hobbing teeth 711 and second hobbing teeth 712 on one pressure roller 710 is as follows: the first hobbing teeth 711, the second hobbing teeth 712, the first hobbing teeth 711, the second hobbing teeth 712, the first hobbing teeth 711, etc., while the arrangement manner of the first hobbing teeth 711 and second hobbing teeth 712 on the other pressure roller 710 is as follows: the second hobbing teeth 712, the first hobbing teeth 711, the second hobbing teeth 712, the first hobbing teeth 711, the second hobbing teeth 712, etc., and the two kinds of hobbing teeth are mutually matched to enable the waste batteries to be broken or fractured between the two kinds of hobbing teeth. Specifically, a gap between every two hobbing teeth may be adjusted, the cracking degree and the particle size of the rolled batteries are controlled by adjusting the gap between the two hobbing teeth, and the rolling unit 700 is further provided with a pressure relief valve; and the fifth driving unit 720 is a motor or a rotating cylinder.

Figure 5:
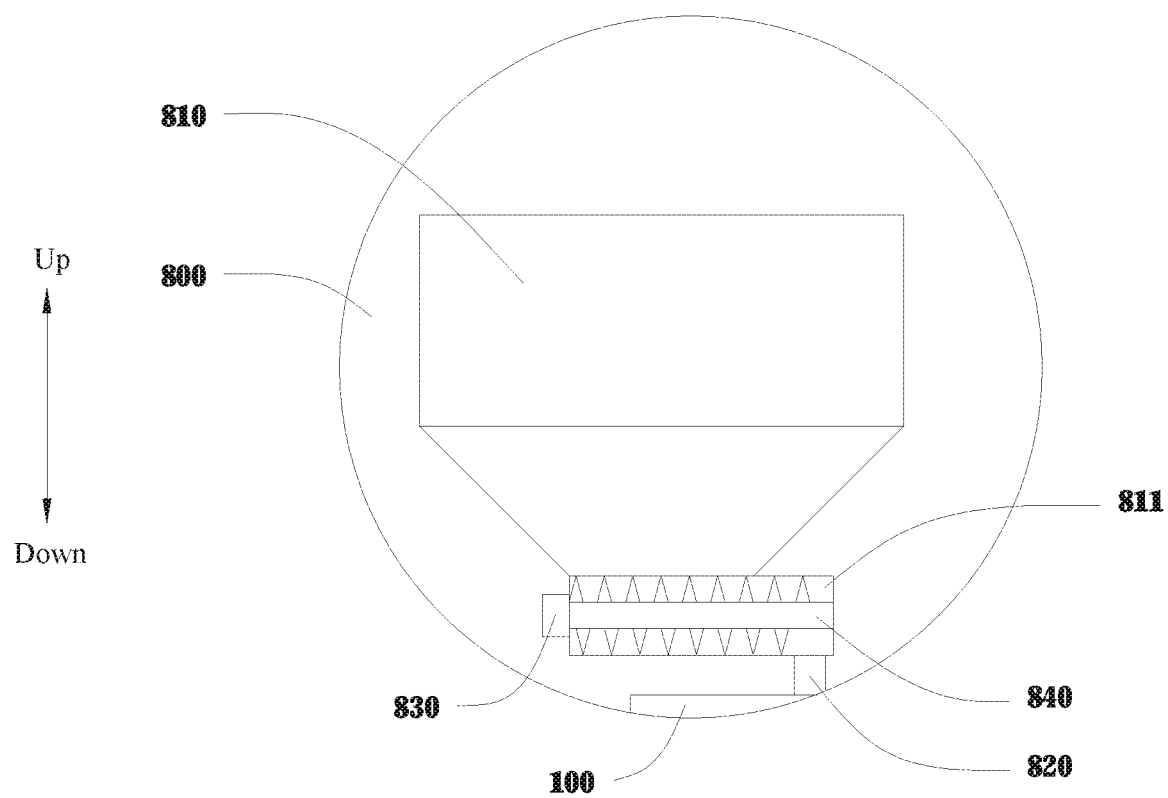
FIG. 5 is a partially enlarged structural diagram of a feeding unit as shown in FIG. 1.

In some embodiments of the present disclosure, as shown in FIGS. 1 and 5, a feeding unit 800 is arranged above the rolling unit 700, is installed on the cylinder 100 and includes a feed hopper 810, a discharge port 820 and a sixth driving unit 830. A feed slot 811 is formed in the feed hopper 810, the bottom of the feed slot 811 is connected with the discharge port 820, and the discharge port 820 is connected with the cylinder 100, a second screw 840 is arranged in the feed slot 811, and the sixth driving unit 830 is used for driving the second screw 840 to rotate. During working, the sixth driving unit 830 is started, the waste batteries are put into the feed hopper 810 fall into the feed slot 811 and are pushed by the second screw 840 to move so as to fall onto the rolling unit 700 through the discharge port 820; and the sixth driving unit 830 may be a motor or a rotating cylinder.

In a further embodiment of the present disclosure, as shown in FIG. 2, the fourth driving unit 230 includes a screw 231, a worm wheel 232, a worm 233 and a first motor 234. A through hole 221 is formed in the middle part of the plug 220 and is provided threads, the plug 220 is connected with the screw 231, the screw 231 is connected with the worm wheel 232, the worm wheel 232 is connected with the worm 233, and the worm 233 is connected with the first motor 234. During working, the first motor 234 is started to drive the worm 233 to rotate, the worm 233 drives the worm wheel to rotate, the worm wheel drives the screw 231 to rotate, and then the screw 231 drives the plug 220 to move up and down; the worm wheel and worm 233 are matched with the screw 231 to withstand the impact of falling of the waste batteries by using the self-locking characteristics of the worm wheel 232 and worm 233.

In a further embodiment of the present disclosure, as shown in FIG. 2, the upper end surface of the circular column 210 is in a conical shape to guide the waste batteries to converge at the middle part of the circular column 210 for facilitating transmission of the waste batteries.

In a further embodiment of the present disclosure, as shown in FIG. 2, a main view shape of the plurality of blade groups 542 installed on the first shaft 541 is matched with the shape of the upper end surface of the circular column 210 of the third sealing unit 600. Specifically, the upper end surface of the circular column 210 is in a conical shape, and the first mixing paddle 540 is in a "diamond" shape matched with the conical shape; and with such a structure, the cracked products at the bottom of the first mixing paddle 540 are fully stirred.

In some embodiments of the present disclosure, as shown in FIG. 1, the outer surface of the first heater 310 and the outer surface of the second heater 510 are both provided with heat insulation layers 311 to prevent hot gas loss and preserve heat.

In some embodiments of the present disclosure, as shown in FIG. 1, a discharging unit 900 is arranged below the third sealing unit 600 and includes a first stop dog 910, a third screw 920, a discharge opening 930 and a second motor 940. The third screw 920 is arranged below the first stop dog 910, the discharge opening 930 is located below the first stop dog 910 and below the third screw 920, and the second motor 940 is used for driving the third screw 920 to rotate. Specifically, one end of the first stop dog 910 is arranged on one side of the inner wall of the cylinder 100, the other end of the first stop dog 910 extends to the middle part of the cylinder 100, and a shape of the first stop dog 910 is a right triangle. During working, the material after pyrolysis falls onto the first stop dog 910, falls onto the third screw 920 through an inclined plane of the first stop dog 910 and is pushed by the third screw 920 to be discharged through the discharge opening 930.

The vacuum cracking method and the cracking apparatus for the power battery provided by the present disclosure are introduced in detail below. In this paper, specific embodiments are applied to illustrate the principle and the implementations of the present disclosure. The descriptions of the above embodiments are only used to help understanding the method and the core idea of the present disclosure, including the best mode and also enable any person skilled in the art to practice the present disclosure, including manufacturing and using any apparatus or system and implementing any combined method. It should be noted that for those skilled in the art, several improvements and modifications may further be made to the present disclosure without departing from the principles of the present disclosure, and these improvements and modifications also fall within the protection scope of the claims of the present disclosure. The scope of patent protection of the present disclosure is defined by the claims, and may include other embodiments that can be thought of by those skilled in the art. If these other embodiments have structural elements that are not different from the literal expression of the claims, or if they include equivalent structural elements that are not substantially different from the literal expression of the claims, these other embodiments shall also be included within the scope of the claim.

The invention claimed is:

1. A vacuum cracking method for power batteries, comprising the following steps:
    (1) feeding waste power batteries from a feed hopper into a roller press for rolling treatment to obtain a crushed material;
    (2) transporting the crushed material to a cracking unit through a first sealing unit for preheating, then heating and cracking the crushed material under an inert atmosphere or vacuum to obtain cracked gas, solid cracked products and non-crackable products; wherein, the cracking is gradient cracking with gradient temperatures of 350-450° C., 450-550° C. and 550-650° C. and a cracking time of 0.2-5 h; and
    (3) transporting the solid cracked products and the non-crackable products to a pyrolysis unit through a second sealing unit for pyrolysis under aerobic atmosphere to obtain pyrolysis gas and non-pyrolysis products, wherein the pyrolysis gas is mainly composed of carbon dioxide and water vapor, and the said non-pyrolysis products are mainly cathode material powder, anode material powder, copper powder, iron powder, aluminum powder and oxides of copper, iron and aluminum; wherein, a pyrolysis temperature is 400-600° C., a pyrolysis time is 0.5-5 h, and a pyrolysis pressure is atmospheric pressure; and
    an apparatus for the vacuum cracking method for power batteries comprises a cylinder and further comprises following components arranged sequentially from top to bottom:
    a rolling unit, arranged in the cylinder and comprising a plurality of pressure rollers arranged at intervals in a vertical direction and a fifth driving apparatus for driving rotation of the pressure rollers;
    the first sealing unit, arranged in the cylinder;
    the cracking unit, arranged in the cylinder and comprising a first heater, a first air inlet, a first air outlet and a pipeline, wherein the first heater is arranged outside the cylinder and heats the outer surface of the cylinder, and the pipeline is connected with the first heater and the first air outlet;
    the second sealing unit, arranged in the cylinder;
    the pyrolysis unit, arranged in the cylinder and comprising a second heater, a second air inlet, a second air outlet, a first stirring paddle and a first driving unit for driving rotation of the first stirring paddle, wherein the second heater is arranged outside the cylinder to make the second heater heat the outer surface of the cylinder, and the second heater is connected with the pipeline; and
    a third sealing unit, arranged in the cylinder;
    the second sealing unit is arranged between the cracking unit in the step (2) and the pyrolysis unit in the step (3);
    the cracking unit further comprises a first screw arranged transversely, a second driving unit, a barrel body, a propeller, a third driving unit and a first bottom plate; the second driving unit is used for driving the first screw to rotate, the third driving unit is used for driving the propeller to rotate, the barrel body is installed below the first screw, the first bottom plate is installed below the barrel body, and the propeller is located in the barrel body and installed on the first bottom plate; the diameter of the barrel body is smaller than that of the cylinder, an opening of the barrel body faces downward, and a clearance space is formed between the opening of the barrel body and the first bottom plate; and a spindle of the propeller is hollow, where the cracked material falls onto the second sealing unit through the hollow portion of the spindle.

2. The vacuum cracking method for the power batteries according to claim 1, wherein, in the step (1), the rolling is performed with a pressure of 50-150 MPa, a rolling speed of 0.5-2 m/s, and a rolling gap width of 5-50 mm.

3. The vacuum cracking method for the power batteries according to claim 1, wherein, in the step (2), the preheating is performed at a temperature of 100-200° C.

4. The vacuum cracking method for the power batteries according to claim 1, wherein, in the step (2), the heating is performed at a heating rate of 3-10° C./min.

5. The vacuum cracking method for the power batteries according to claim 1, wherein, in the step (2), the cracked gas is a mixture of C3-C12 alkenes and alkanes.

6. The vacuum cracking method for the power batteries according to claim 1, wherein, in the step (3), the pyrolysis atmosphere is air or oxygen.

7. The vacuum cracking method for the power batteries according to claim 1, wherein the pyrolysis gas in the step (2) is the pyrolysis fuel in the step (3).

8. The vacuum cracking method for the power batteries according to claim 1, wherein, in the step (3), the cathode material powder is one of nickel cobalt lithium manganese, lithium iron phosphate or lithium manganese; and the anode material powder is one of graphite or lithium titanate.

* * * * *